United States Patent Office

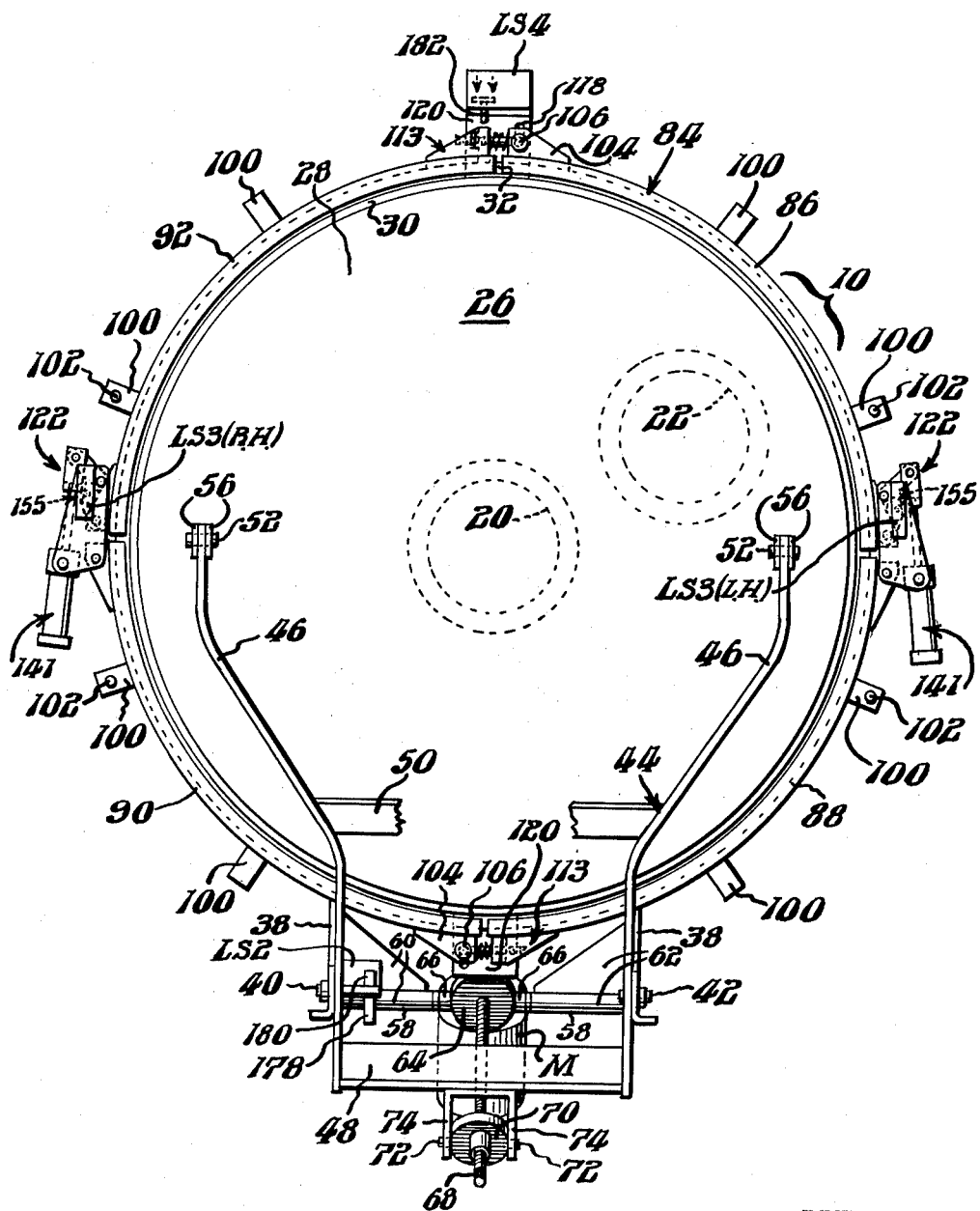

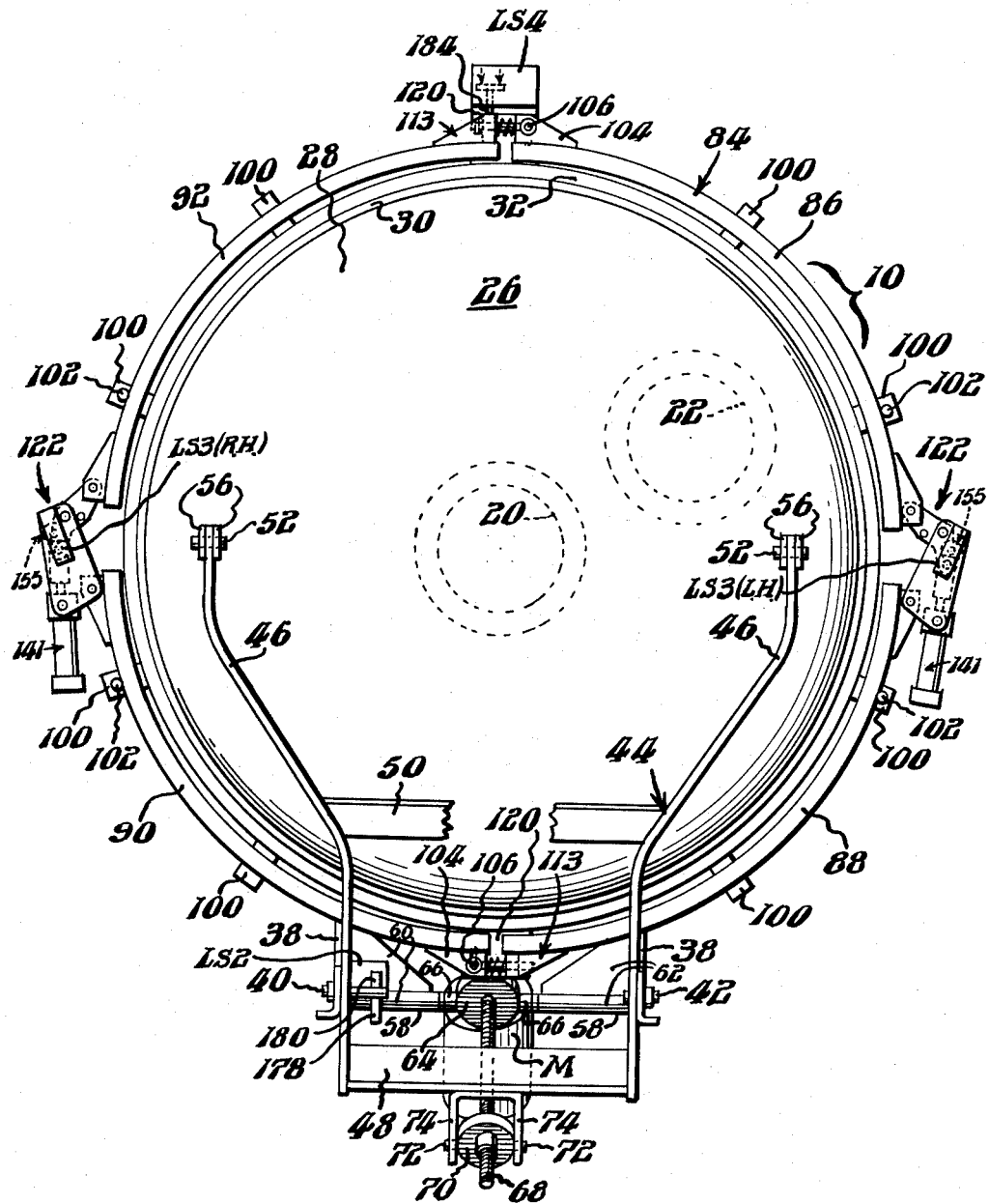

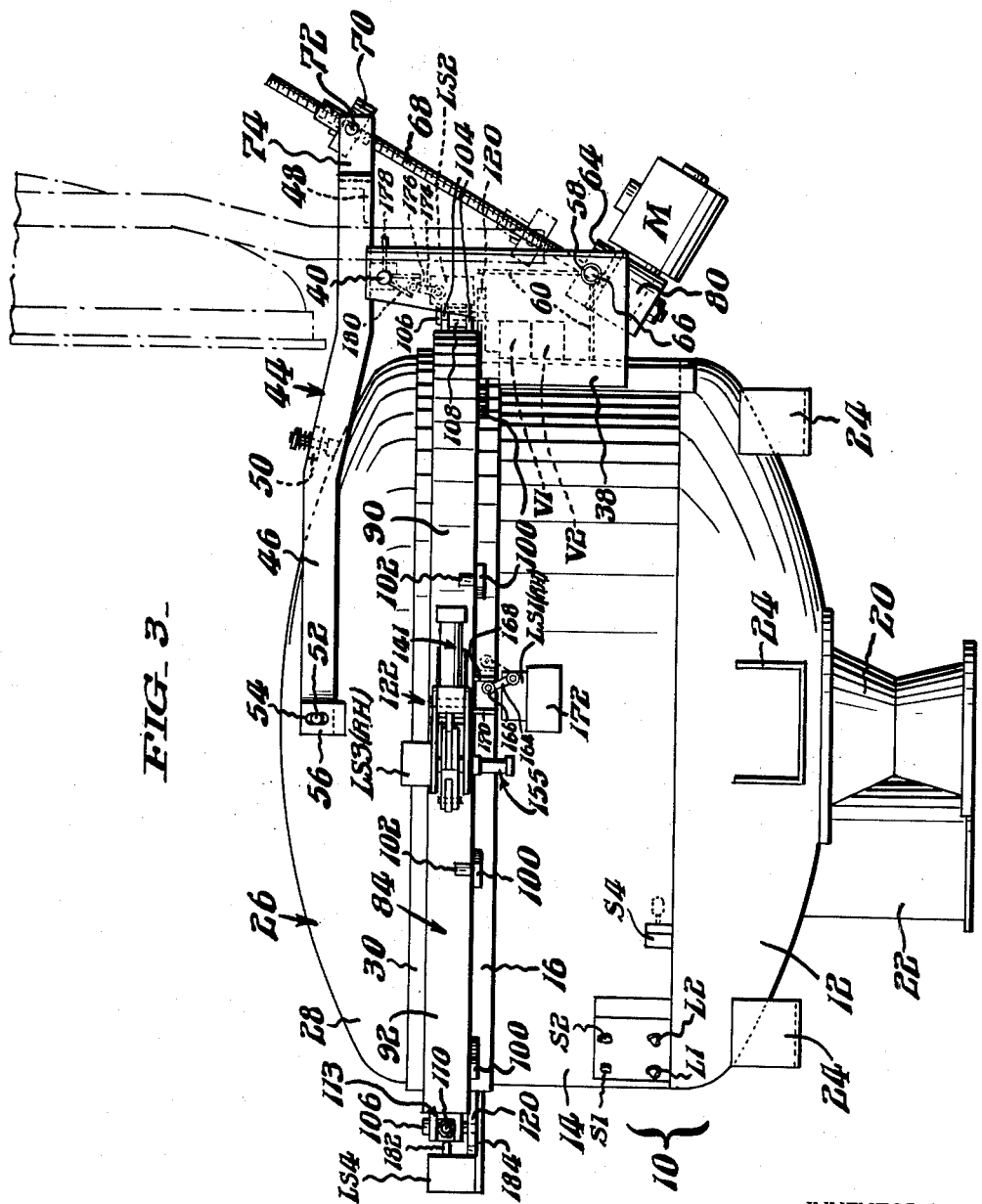

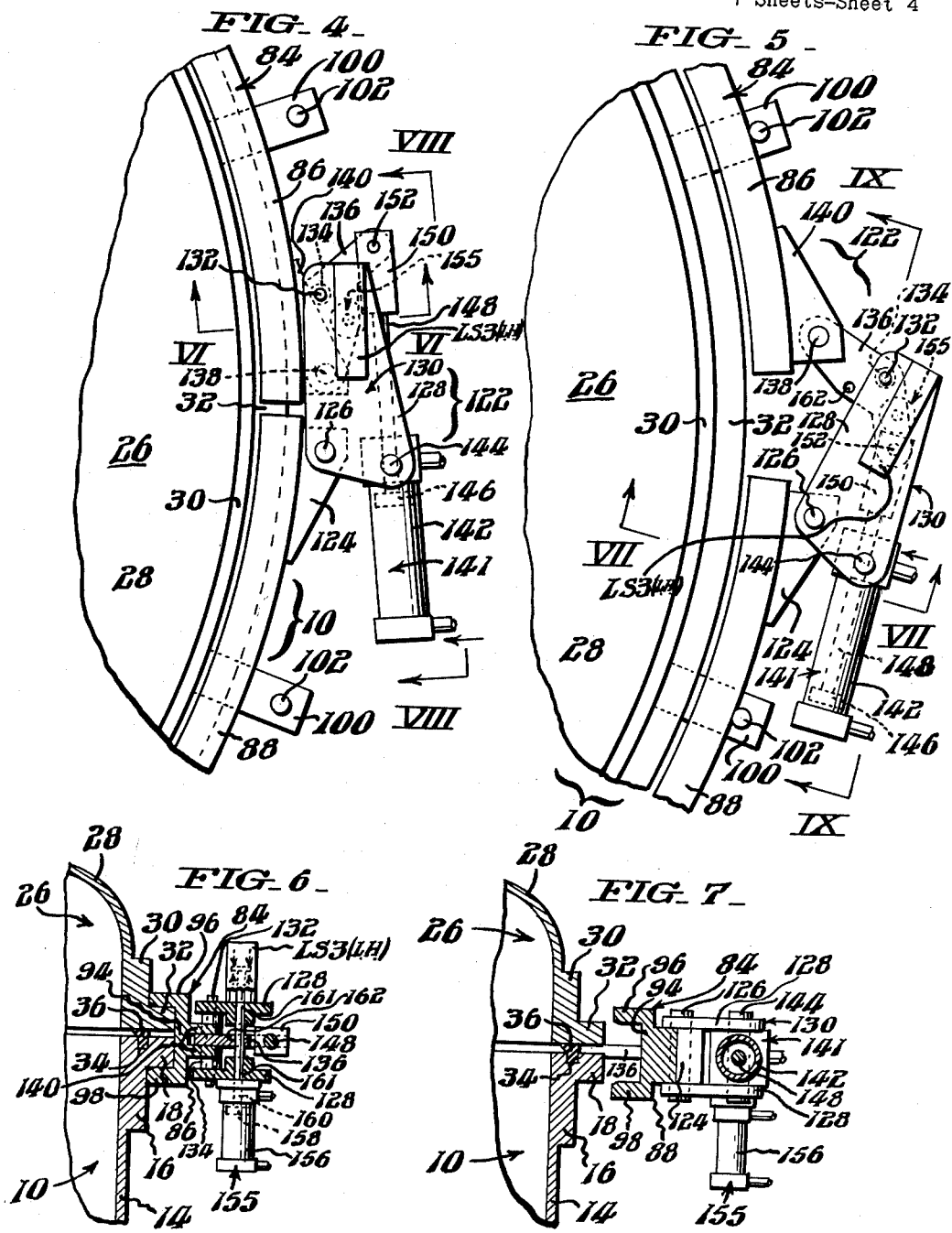

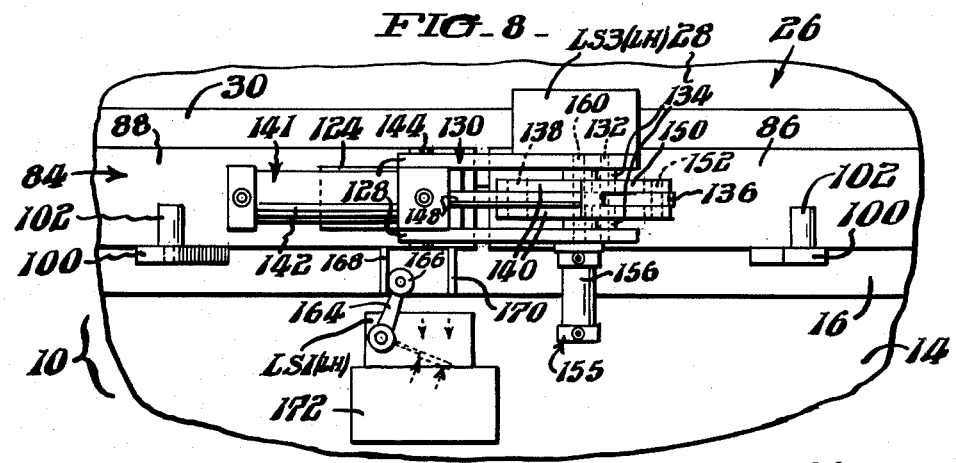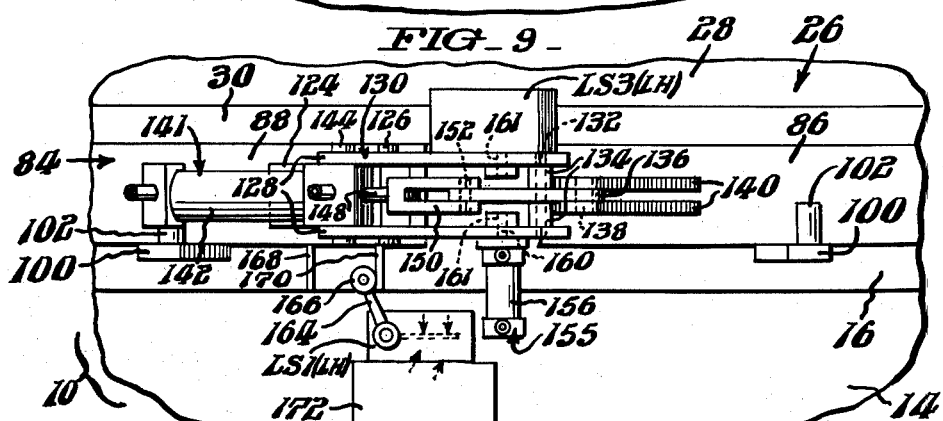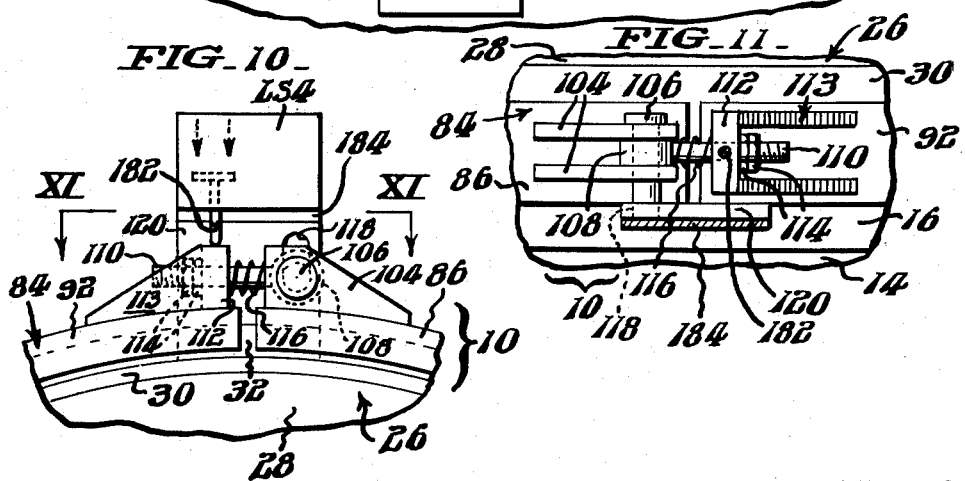

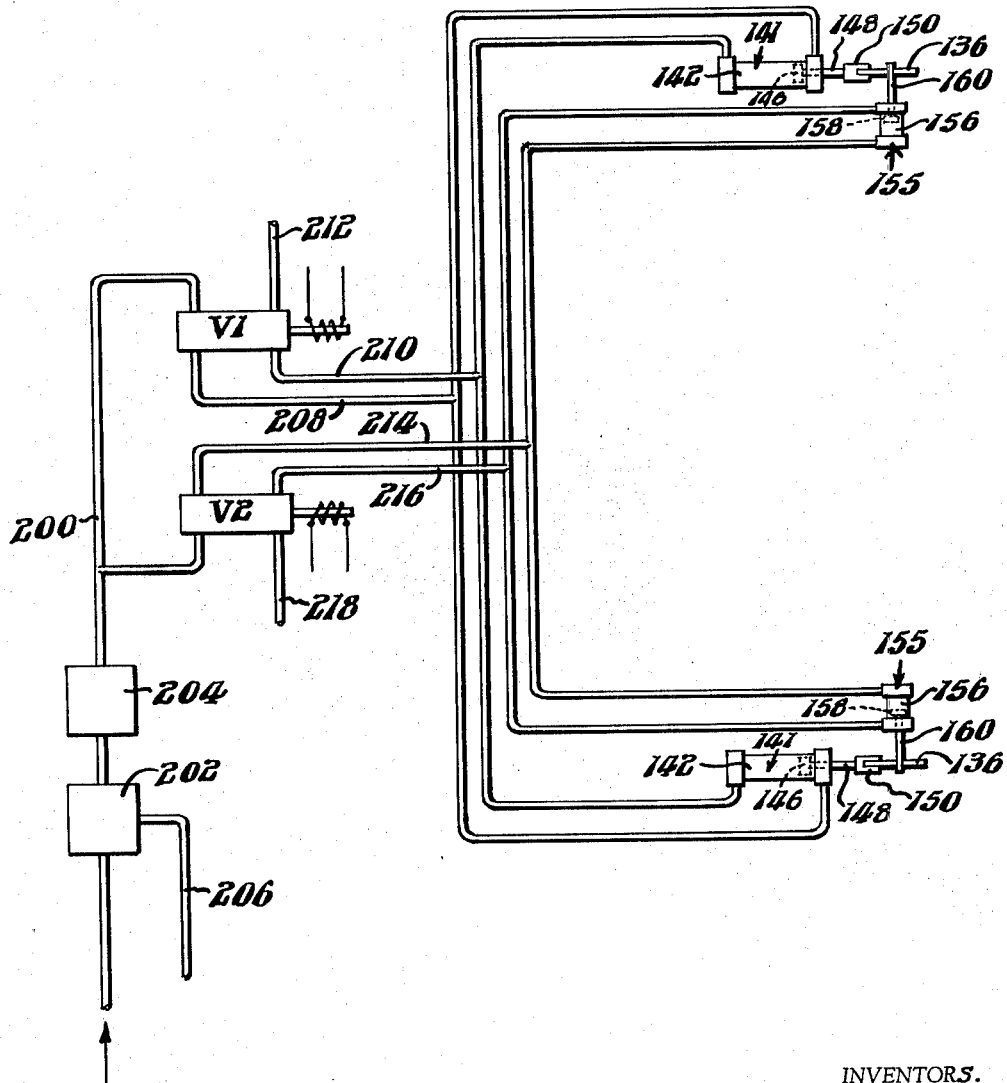

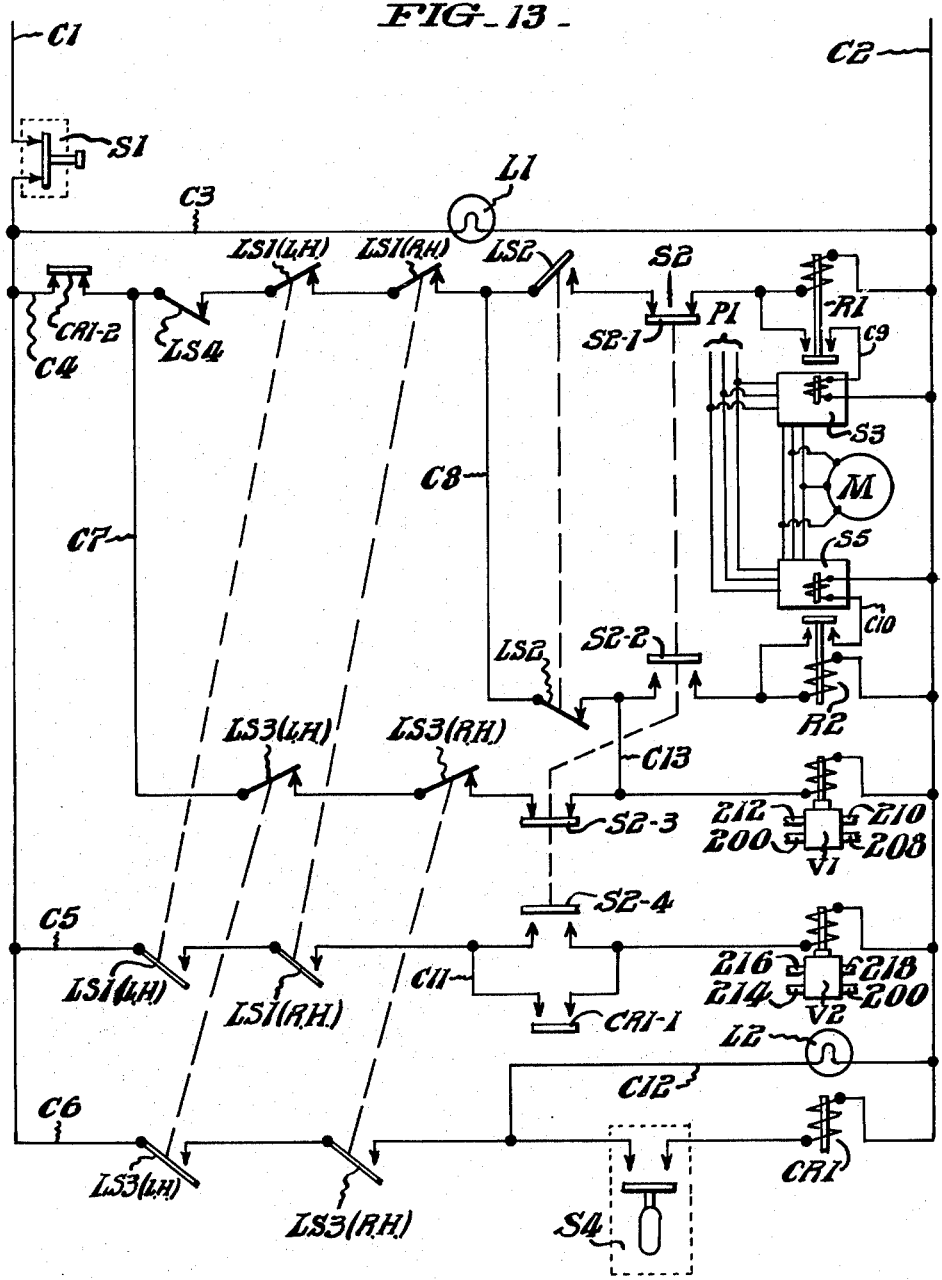

3,144,165
Patented Aug. 11, 1964

3,144,165
LOCKING MEANS FOR PRESSURE VESSEL
Alexander A. Pegon, Norristown, Gordon P. Franklin, Lansdale, and Russell B. Rosander, Wayne, Pa., assignors to Turbo Machine Company, Lansdale, Pa., a corporation of Pennsylvania
Filed Aug. 29, 1962, Ser. No. 220,341
7 Claims. (Cl. 220—55.3)

This invention relates generally to pressure vessels and particularly to an improved construction of means for securing the lid of a pressure vessel.

An important object of the invention is to provide a ring around the lid of a pressure vessel adapted to be contracted to a closed position for locking the lid to the body of the pressure vessel and to be re-expanded to an open position for releasing the lid by toggle mechanisms operated by fluid pressure motors.

Another object is to provide such a ring which, after being closed, is locked in closed position by fluid pressure motors.

Another object is to provide such a ring wherein the fluid pressure motors are mounted upon the ring.

Another object is to provide such a ring which, after being closed and locked in closed position, cannot be unlocked and reopened so long as there is pressure in the vessel.

Another object is to provide such a ring which automatically locks after being closed and automatically reopens after being unlocked.

Other objects of the invention will become apparent when the following description is read with reference to the accompanying drawings, in which:

FIGURE 1 is a plan view of a pressure vessel and a locking ring embodying the invention, the ring being locked in closed position;

FIGURE 2 is similar to FIGURE 1, but the locking ring is unlocked and in open position;

FIGURE 3 is a side elevation of the vessel shown in FIGURE 1, the open position of the lid being shown by broken lines;

FIGURES 4 and 5 are fragmentary plan views showing the toggle mechanism in extreme positions;

FIGURES 6 and 7 are sections respectively on lines VI—VI of FIGURE 4 and VII—VII of FIGURE 5;

FIGURES 8 and 9 are views respectively on lines VIII—VIII of FIGURE 4 and IX—IX of FIGURE 5;

FIGURE 10 is a fragmentary plan view at the front of the vessel;

FIGURE 11 is a section on line XI—XI of FIGURE 10;

FIGURE 12 is a diagram schematically showing the fluid pressure circuit; and

FIGURE 13 is a diagram schematically showing the electrical control system.

Referring to the drawings, the pressure vessel, generally designated 10, is provided with a dished bottom wall 12, an upright cylindrical wall 14 and a rim 16, the rim being undercut to provide a radially outwardly extending flange 18. Depending from the bottom wall 12 are a laterally spaced inlet 20 and outlet 22. The bottom wall 12 is fitted with circumferentially spaced brackets 24 by means of which the vessel 10 is seated upon a supporting structure (not shown).

The vessel 10 is provided with a lid, generally designated 26, having a domed top wall 28 and rim 30 terminating in a radially outwardly extending flange 32 overlying the flange 18, which latter flange is provided with a groove 34 fitted with a sealing ring 36. The faces of said flanges are parallel.

Affixed to the cylindrical wall 14 of the vessel 10 are a pair of upright laterally spaced brackets 38 which carry respectively coaxially aligned pivot pins 40 and 42. Mounted upon these pins is a rigid frame, generally designated 44, provided with laterally spaced arms 46 connected by cross members 48 and 50. The fore end portions of the arms 46 carry pivot coaxially aligned pins 52 freely movable in elongated openings 54 provided in upstanding ears 56 affixed to the top of the lid.

Affixed to the brackets 38 and extending inwardly therefrom toward one another in coaxial relation are a pair of sleeves 58 secured by brace plates 60 and 62. Interposed between the sleeves 58 is a disc 64 provided with a pair of trunnions 66 extending therefrom in opposite directions and received respectively by the sleeves 58. Threaded through the disc 64 is a screw 68 which extends upwardly and rearwardly therefrom. The screw 68 is threaded through a second disc 70 which is provided with a pair of coaxially aligned trunnions 72 extending in opposite directions therefrom and projecting respectively through the legs 74 of a U-shaped bracket affixed to the cross member 48. The lower end portion of the screw 68 extends into a gear box 80 to which is connected a reversible electric motor M.

The vessel 10 is provided with a locking ring assembly, generally designated 84, which assembly comprises four arcuate ring segments 86, 88, 90 and 92. Each segment is channel-shaped in transverse section, being provided with a web 94, top flange 96 and bottom flange 98. The assembly is seated upon a set of circumferentially spaced brackets 100, certain of which are provided with upright stop pins 102.

At the front and rear of the vessel the opposed end portions of the ring segments are connected together in the manner now to be described. A pair of vertically spaced plates 104 are affixed to the web 94 of one ring segment. Extending through registering openings in plates 104 is a bolt 106 which also extends through the head 108 of an eye bolt disposed between the plates 104. The shank of the eye bolt, designated 110, extends through the leg connecting portion 112 of a U-shaped member, generally designated 113, and is fitted with a pair of nuts 114. The U-shaped member 113 is affixed to the web 94 of the other ring segment. Wrapped around the shank 110 is a compression spring 116 disposed between the head 108 of the eye bolt and the part 112 of the U-shaped member 113. The lower terminal portion of the bolt 106 extends into an elongated opening 118 in a plate bracket 120 affixed to the vessel 10. The opposed end portions of the ring segments slidably rest upon the brackets 120.

On each side of the vessel 10 is a toggle mechanism, generally designated 122, connecting opposed end portions of the ring segments. The toggle mechanisms are right and left hand, in consequence of which a description of one such mechanism will suffice.

Affixed to the web 94 of one ring segment is a lug 124 which mounts a pivot pin 126. Connected respectively to opposite end portions of the pin 126 are a pair of vertically spaced plates 128 which conjointly provide a link 130. Mounted upon the link 130 is a pivot pin 132 which extends through bosses 134 formed on a link 136. Mounted upon link 136 is a pin 138 having opposite end portions respectively received by a pair of vertically spaced plates 140 affixed to the web 94 of the other ring segment.

Interposed between the plates 128 is the head of a fluid pressure motor, generally designated 141, which motor is provided with a cylinder 142 having trunnions 144 respectively received by the plates 128. Working in the cylinder 142 is a piston 146 from which extends a rod 148 mounting a clevis 150. Pivotally connecting the clevis 150 to an extension of link 136 is a pin 152.

Depending from the link 130 is another fluid pressure motor, generally designated 155, which motor is provided with a cylinder 156 affixed to the lower one of the plates 128. Working in the cylinder 156 is a piston 158 and a piston rod 160. The rod 160 is adapted to extend through registering openings in the links 130 and 136 when the locking ring is closed, the openings in the link 130 being designated 161 and the opening in the link 136 being designated 162.

Associated with each toggle mechanism is a limit switch LS1 provided with a pivoted actuating arm 164 which carries a roller 166 located for engagement by plates 168 and 170 depending from the flange 98 of the ring segment in spaced relation to each other. The switch LS1 is carried by a bracket 172 affixed to the side of the vessel 10.

At the rear of the vessel is a limit switch LS2 provided with an actuating arm 174 mounting a roller 176 located for engagement with a plate 178 and a plate 180 affixed to the pin 40 and extending radially outwardly therefrom in angularly spaced relation.

On each side of the vessel a limit switch LS3 is seated upon the upper one of the plates 128, being arranged for actuation by the rod 160 of the motor 155.

At the front of the vessel 10 is a limit switch LS4 provided with an actuating pin 182. The switch LS4 is seated upon an extension 184 of the bracket 120.

Referring particularly to FIGURE 12, the pneumatic circuit comprises a pressurized air supply line 200 in which is connected an air filter 202 and an air lubricator 204. From the air filter 202 there extends a drain 206. Connected in the line 200 are a pair of solenoid actuated valves V1 and V2. From the valve V1 extend air supply lines 208 and 210 which supply air to the cylinders 142. Air is exhausted from the valve V1 via line 212. From the valve V2 extend air supply lines 214 and 216 through which air is supplied to the cylinders 156. Air is exhausted through the valve V2 via line 218.

Referring particularly to FIGURE 13, power is supplied to the electrical control system through conductors C1 and C2 when a switch S1 connected in conductor C1 is closed. Connected in parallel across these conductors are conductors C3, C4, C5 and C6. Connected in conductor C3 is an indicating lamp L1. Connected in series in conductor C4 are a pair of contacts CR1–2 of a control relay CR1, the limit switch LS4, a section of the limit switch LS1 (L.H.), a section of limit switch LS1 (R.H.), a section of limit switch LS2, a section S2–1 of a manually controlled switch S2 and the coil of a relay R1. Connected in series in conductor C5 are another section of limit switch LS1 (L.H.), another section of limit switch LS1 (R.H.), a section S2–4 of switch S2 and the coil of solenoid operated valve V2. Connected in series in conductor C6 are a section of limit switch LS3 (L.H.), a section of limit switch LS3 (R.H.), a pressure responsive switch S4 and the coil of control relay CR1. Connected in parallel with a section of conductor C4 is a conductor C7 in which is connected in series a second section of limit switch LS3 (L.H.), a second section of limit switch LS3 (R.H.), a section S2–3 of switch S2 and the coil of solenoid operated valve V1. Connected in parallel with another section of conductor C4 is a conductor C8 in which is connected in series a second section of limit switch LS2, a section S2–2 of switch S2 and the coil of a relay R2. Connected across the coil of R1 is a conductor C9 in which is connected in series the contacts of relay R1 and the coil of a reversing relay S3. Connected across the coil of R2 is a conductor C10 in which is connected in series the contacts of relay R2 and the coil of a reversing relay S5. Connected across the section S2–4 of switch S2 is a conductor C11 in which is connected contacts CR1–1 of the control relay CR1. Connected across switch S4 and the coil of relay CR1 is a conductor C12 in which is connected an indicating lamp L2. Connected between conductors C7 and C8 is a conductor C13, as shown.

Power is supplied to the motor M, for example, through a 220-volt 60-cycle three-phase line P1.

In the normal condition of the apparatus, the manually operated switch S1 is closed, in consequence of which the lamp L1 is illuminated, indicating that the power is on. In this condition of the apparatus, fluid pressure is supplied to motors 141 to hold the locking ring in expanded condition. In addition, the lid 26 is fully raised, as shown by broken lines in FIGURE 3.

The first step in the use of the apparatus is to actuate switch S2, whereupon motor M is energized to lower lid 26. Through suitable gearing in box 80 the screw 68 is turned in a direction to work the disc 70 upwardly on the screw 68, from the broken to the full line position shown in FIGURE 3. The motor M, box 80, disc 64 and screw 68 pivot freely on trunnions 66, disc 70 pivots freely on trunnions 72 relative to frame 44 and frame 44 pivots freely on pins 40 and 42. Thus the lid is lowered to its closed position. As the lid closes, plate 178 swings away from the roller 176 and the plate 180 swings toward roller 176 to operate the switch LS2, which initiates closing of the locking ring.

Fluid pressure is supplied to motors 141 to extend the piston rods 148, whereupon the links 130 and 136 pivot from the positions thereof exemplified in FIGURE 5 to the positions thereof exemplified in FIGURE 4, in which latter positions the links 130 and 136 are swung past center, i.e., have moved the pins 132 each past an upright plane containing the axes of the two associated pins 126 and 138. As the toggle mechanisms close, the ring segments 86, 88, 90 and 92 move radially inwardly over the brackets 100 and 120. In approaching their final positions, they conjointly embrace the flange 18 of the vessel 10 and flange 32 of the lid 26, drawing them together to effectively seal the vessel. At the same time, the plates 170 move horizontally away from the rollers 166 and the plates 168 move horizontally toward the rollers 166 to operate the switches LS1 (L.H.) and LS1 (R.H.). In addition, the part 112 moves inwardly away from the pin 182 for operation of switch LS4. This initiates locking of the ring assembly 84.

Fluid pressure is supplied to the motors 155 to extend the piston rods 160, whereupon the piston rods project through the openings 162 in the links 136 and the openings 162 in the links 136 and the openings 161 in the links 130 to operate the switches LS3 (L.H.) and LS3 (R.H.). Upon operation of switches LS3 (L.H.) and LS3 (R.H.) the lamp L2 is illuminated, indicating that the locking ring is closed and locked and that the pressure vessel is ready for the desired process. Preferably, the start of the process is electrically controlled, in which case the arrangement is such that the start circuit (not shown) cannot be energized until both piston rods 160 are in locking position.

The desired process is now started, i.e., textile materials in the vessel are subjected to treatment fluid under pressure admitted through inlet 20. When the pressure is, for example, above atmopsheric, switch S4 operates, making it impossible to open the lid 26 until the internal pressure again drops to atmospheric. It will be noted that even if there is an air or power failure, the locking ring will remain closed, i.e. it is not self-releasing and will not open, even under pressure. When the process is completed any pressure above atmospheric is exhausted, whereupon the switch S4 reopens making it again possible to reopen the lid 26 for removal of treated textile materials and for reloading of the vessel.

The operator may now operate switch S2 again. This initiates unlocking of the ring.

Fluid pressure is supplied to motors 155 to retract the piston rods 160 and operate switches LS3 (L.H.) and LS3 (R.H.). This initiates opening of the ring.

Fluid pressure is supplied to the motors 141 to again retract the piston rods 148, whereupon the links 130 and 136 pivot from their positions indicated in FIGURE 4 back to their initial positions indicated in FIGURE 5. During this opening movement, the ring segments 86, 88, 90 and 92 slide radially outwardly on their supporting brackets, engaging the stop pins 102 and the pin 182 of the limit switch LS4. At the same time, the plates 168 move horizontally away from the rollers 166 and the plates 170 re-approach the rollers 166 to operate switches LS1 (L.H.) and LS1 (R.H.). This energizes motor M, which operates to raise the lid. When the lid is fully raised, plate 178 operates switch LS2. Thus the apparatus is returned to its normal condition. After the treated textile materials have been removed from the pressure vessel, the same may be reloaded and the procedure described above repeated. The treatment fluid may be drained from the vessel, before or after the lid is opened, through outlet 22.

Referring particularly to FIGURE 13, as stated hereinabove when switch S1 is closed, current is supplied to lamp L1, which lights up to indicate that the power is on. At the same time, the coil of solenoid operated valve V1 is energized and the valve operates to supply fluid pressure to cylinders 142 to hold the toggle mechanisms 122 and the locking ring 84 open. To close the lid 26, the operator manually operates switch S2, whereupon the contacts S2-2 close. Thus the coil of relay R2 is energized, contacts of relay R2 are closed and the coil of reversing relay S5 is energized, whereupon power is supplied to motor M, which operates to lower the lid 26.

As the lid approaches its fully closed position, the limit switch LS2 operates, whereupon the lower section of LS2 opens, cutting off power to motor M. At the same time, the coil of valve V1 is deenergized, and the valve operates to supply fluid pressure to cylinders 142 to close the toggle mechanisms 122 and the locking ring 84. As the locking ring closes, the switches LS1 (L.H.), LS1 (R.H.) and LS4 operate. Thus the lower section of LS1 (L.H.) and the lower section of LS1 (R.H.) close, energizing the coil of solenoid operated valve V2, and the valve operates to supply fluid pressure to cylinders 156 to extend the piston rods 160 for locking the ring. The piston rods 160 operate the switches LS3 (L.H.) and LS3 (R.H.). Thus the lower section of limit switch LS3 (L.H.) and limit switch LS3 (R.H.) close, whereupon current is supplied to lamp L2, which is illuminated, indicating that the locking ring is closed and locked and that the vessel is ready for the start of the desired process.

When the pressure rises above atmospheric, switch S4 closes, whereupon coil of control relay CR1 is energized, contacts CR1-1 close and contacts CR1-2 open. In this condition of the apparatus, the manually operated switch S2 can be actuated as desired, but the contacts CR1-1 hold the coil of valve V2 energized and the ring locked.

When the process has been completed, pressure in the vessel is relieved, whereupon switch S4 opens. Thus the coil of the control relay CR1 is deenergized and contacts CR1-1 reopen, whereupon the coil of valve V2 is deenergized, and the valve operates to supply fluid pressure to cylinders 156 to retract piston rods 160 to unlock the ring. At the same time, contacts CR1-2 reclose. When piston rods 160 retract, limit switch LS3 (L.H.) and LS3 (R.H.) operate again. Accordingly, the lower section of limit switch LS3 (L.H.) and the lower section of limit switch LS3 (R.H.) reopen, and lamp L2 goes out. The upper section of limit switch LS3 (L.H.) and limit switch LS3 (R.H.) reclose, whereupon the coil of valve V1 is energized and the valve operates to supply fluid pressure to cylinders 142 to open the toggle mechanisms 122 and the ring 84.

As the ring approaches its fully open condition, limit switch LS1 (L.H.), limit switch LS1 (R.H.) and limit switch LS4 operate again. Thus the coil of relay R1 is energized, the contacts of relay R1 are closed and the coil of reversing relay S3 is energized. Power is thus supplied to the motor M, which operates to raise the lid 26.

When the lid is fully open, limit switch LS2 operates again, thus cutting off the power to the motor. Thus the electrical control system is returned to its normal condition.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

What is claimed is:

1. In combination with a pressure vessel having an annular flange extending radially outwardly from and all around an access opening, and a lid fitted over said access opening and flange, a locking ring assembly adapted to contract from an expanded condition in which said lid may move freely therethrough to a condition in which the peripheries of said flange and lid are releasably locked together including a plurality of ring segments, a pair of toggle linkages each interposed between and connecting opposed end portions of said ring segments, a pair of fluid pressure motors respectively mounted directly upon and carried by said linkages, and controlled means for supplying fluid pressure to said motors for actuating the same thereby to operate said toggle linkages.

2. In combination with a pressure vessel having an annular flange extending radially outwardly from and all around an access opening, and a lid fitted over said access opening and flange, a locking ring assembly adapted to contract from an expanded condition in which said lid may move freely therethrough to a condition in which the peripheries of said flange and lid are releasably locked together including a plurality of ring segments, a pair of toggle linkages each interposed between and connecting opposed end portions of said ring segments, a first pair of fluid pressure motors respectively mounted directly upon and carried by said toggle linkages, a separate second pair of fluid pressure motors respectively mounted directly upon and carried by said toggle linkages, and controlled means for supplying fluid pressure to said first pair of motors for actuating the same thereby to operate said toggle linkages and to said second pair of motors for actuating the same thereby to lock said toggle linkages.

3. In combination with a pressure vessel having an annular flange extending radially outwardly from and all around an access opening, and a lid fitted over said access opening and flange, a locking ring assembly adapted to contract from an expanded condition in which said lid may move freely therethrough to a condition in which the peripheries of said flange and lid are releasably locked together including a plurality of ring segments, toggle linkage means interposed between said ring segments, each of said toggle linkage means including a pair of links pivotally connected respectively to opposed end portions of a pair of said segments and to each other, a pressure cylinder pivotally mounted upon one link of said pair of links, and a piston adapted to work in said cylinder and pivotally connected to the other link of said pair of links, and controlled means for supplying fluid pressure to each of said cylinders for actuating its piston thereby to operate said toggle linkage means.

4. In combination with a pressure vessel having an annular flange extending radially outwardly from and all around an access opening, and a lid fitted over said access opening and flange, a locking ring assembly adapted to contract from an expanded condition in which said lid may move freely therethrough to a condition in which the peripheries of said flange and lid are releasably locked together including a plurality of ring segments, toggle linkage means interposed between said ring segments, each of said toggle linkage means including a pair of link's pivotally connected respectively to opposed end portions of a pair of said segments and to each other, a first fluid pressure cylinder pivotally mounted upon one link of said pair of links, a first piston adapted to work in said first cylinder and pivotally connected to the other link of said pair of links, a second fluid pressure cylinder affixed to said one link of the pair of links, a second piston adapted to work in said second cylinder, and controlled means for supplying fluid pressure to said cylinders for extending said first piston thereby to operate said toggle linkage means and to extend said second piston thereby to lock said toggle linkage means.

5. In combination with a pressure vessel having an annular flange extending radially outwordly from and all around an access opening, and a lid adapted for being closed over said access opening and flange, a locking ring assembly adapted to contract from an expanded condition in which said lid may move freely therethrough to a condition in which the peripheries of said flange and lid are releasably locked together including a plurality of ring segments, toggle linkage means interposed between and connecting said ring segments, fluid pressure motors carried by said ring and operable for actuating and locking said toggle linkage means, and controlled means for automatically supplying fluid presure to said motors first to actuate and then to lock said toggle linkage means in response to closing of said lid.

6. In combination with a pressure vessel having an annular flange extending radially outwardly from all around an access opening, and a lid adapted for being closed over said access opening and flange, a locking ring assembly adapted to contract from an expanded condition in which said lid may move freely therethrough to a condition in which the peripheries of said flange and lid are releasably locked together including a plurality of ring segments, toggle linkage means interposed between and connecting said ring segments, means for supplying fluid pressure to said motors, electrical control means for causing fluid pressure to be supplied to said motors first to actuate and then to lock said toggle linkage means automatically in response to closing of said lid, said electrical control means including means responsive to pressure in said vessel for holding said toggle linkage means locked.

7. In combination with a pressure vessel having an anular flange extending radially outwardly from and all around an access opening, and a lid adapted for being closed over said access opening and flange, a locking ring assembly adapted to contract from an expanded condition in which said lid may move freely therethrough to a condition in which the peripheries of said flange and lid are releasably locked together including a plurality of ring segments, toggle linkage means interposed between and connecting said ring segments, means for supplying fluid pressure to said motors, electrical control means operable for causing fluid pressure to be supplied to said motors first to actuate and then to lock said toggle linkage means automatically in response to closing of said lid, and being operable only when there is no pressure in said vessel for causing fluid pressure to be supplied to said motors first to unlock and then to actuate said toggle linkage means.

References Cited in the file of this patent

UNITED STATES PATENTS

| | | |
|---|---|---|
| 2,399,327 | Cullen | April 30, 1946 |
| 2,780,384 | Stratton et al. | Feb. 5, 1957 |
| 2,834,504 | Annico | May 13, 1958 |
| 2,841,308 | Weicker | July 1, 1958 |